US012661640B2

(12) United States Patent
Schreyer et al.

(10) Patent No.: US 12,661,640 B2
(45) Date of Patent: Jun. 23, 2026

(54) CHA TYPE ZEOLITIC MATERIALS AND METHODS FOR THEIR PREPARATION

(71) Applicants: BASF SE, Ludwigshafen am Rhein (DE); The University of Tokyo, Tokyo (JP)

(72) Inventors: Hannah Schreyer, Ludwigshafen (DE); Andrei-Nicolae Parvulescu, Ludwigshafen (DE); Ulrich Mueller, Ludwigshafen (DE); Karsten Seidel, Ludwigshafen (DE); Tatsuya Okubo, Tokyo (JP); Toru Wakihara, Tokyo (JP); Kenta Iyoki, Tokyo (JP); Watcharop Chaikittisilp, Tokyo (JP)

(73) Assignees: BASF Mobile Emissions Catalysts LLC, Iselin, NJ (US); The University of Tokyo, Toyko (JP)

( * ) Notice: Subject to any disclaimer, the term of this patent is extended or adjusted under 35 U.S.C. 154(b) by 802 days.

(21) Appl. No.: 17/309,783

(22) PCT Filed: Dec. 18, 2019

(86) PCT No.: PCT/EP2019/085854
§ 371 (c)(1),
(2) Date: Jun. 18, 2021

(87) PCT Pub. No.: WO2020/127425
PCT Pub. Date: Jun. 25, 2020

(65) Prior Publication Data
US 2022/0097033 A1      Mar. 31, 2022

(30) Foreign Application Priority Data
Dec. 19, 2018    (EP) .................................... 18213896

(51) Int. Cl.
| | |
|---|---|
| *B01J 29/76* | (2006.01) |
| *B01J 35/61* | (2024.01) |
| *B01J 37/02* | (2006.01) |
| *B01J 37/08* | (2006.01) |
| *B01J 37/30* | (2006.01) |
| *C01B 39/48* | (2006.01) |

(52) U.S. Cl.
CPC ........... *B01J 29/763* (2013.01); *B01J 35/612* (2024.01); *B01J 35/613* (2024.01); *B01J 35/615* (2024.01); *B01J 37/0201* (2013.01); *B01J 37/082* (2013.01); *B01J 37/30* (2013.01); *C01B 39/48* (2013.01); *C01P 2004/03* (2013.01); *C01P 2006/12* (2013.01)

(58) Field of Classification Search
None
See application file for complete search history.

(56) References Cited

U.S. PATENT DOCUMENTS

| | | |
|---|---|---|
| 4,610,854 A | 9/1986 | Zones |
| 2007/0043249 A1 | 2/2007 | Cao et al. |
| 2017/0113210 A1 | 4/2017 | Chen et al. |

FOREIGN PATENT DOCUMENTS

| | | | |
|---|---|---|---|
| CN | 106745034 A | * | 5/2017 |
| EP | 2 325 143 A2 | | 5/2011 |
| WO | WO 2008/033229 A | | 3/2008 |
| WO | WO 2008/083048 A | | 7/2008 |
| WO | WO 2009/141324 A1 | | 11/2009 |
| WO | WO 2011/064186 A1 | | 6/2011 |
| WO | WO 2013/182974 A1 | | 12/2013 |
| WO | WO 2015/185625 A1 | | 12/2015 |
| WO | WO 2017/211237 A1 | | 12/2017 |

OTHER PUBLICATIONS

Machine Translation of CN106745034 (Year: 2017).*
International Search Report dated Feb. 21, 2020, PCT/EP2019/085854.
Xu et al., "Template Design and Economical Strategy for the Synthesis of SSZ-13 (CHA-Type) Zeolite . . . ," Chemcatchem, vol. 7, No. 23, pp. 3842-3807, Sep. 28, 2015.
Sarker et al., "Synthesis of SSZ-13 zeolite in the presence of dimethylethylcyclohexyl ammonium ion and direct . . . ," Chemical Engineering Journal, pp. 1-14, Oct. 9, 2019.
Zones et al. "A Study of Guest/Host Energetics for the Synthesis of Cage Structures NON and CHA" in Studies in Surface Science and Catalysis, vol. 84, pp. 29-36, Elsevier Science B.V. (1994).

* cited by examiner

*Primary Examiner* — Michael Forrest
(74) *Attorney, Agent, or Firm* — DLA Piper LLP (US)

(57) ABSTRACT

The present disclosure relates to a process for the preparation of a zeolitic material having a CHA-type framework structure comprising $YO_2$ and $X_2O_3$, wherein the process comprises:

(1) providing a mixture comprising one or more sources for $YO_2$, one or more sources for $X_2O_3$, one or more tetraalkylammonium cation $R^1R^2R^3R^4N^+$-containing compounds, and one or more tetraalkylammonium cation $R^5R^6R^7R^8N^+$-containing compounds as structure directing agent;

(2) crystallizing the mixture to obtain a zeolitic material having a CHA-type framework structure;

wherein Y is a tetravalent element and X is a trivalent element, wherein $R^1$, $R^2$, $R^3$, $R^5$, $R^6$, and $R^7$ independently from one another stand for alkyl, wherein $R^4$ stands for $C_nH_{2n}OH$ with n=1 to 6, and wherein $R^8$ stands for cycloalkyl.

9 Claims, 5 Drawing Sheets

01e50k SE 500 nm

CHA TYPE ZEOLITIC MATERIALS AND METHODS FOR THEIR PREPARATION

This application is a U.S. national phase entry application under 35 U.S.C. § 371 from PCT International Application No. PCT/EP2019/085854, filed Dec. 18, 2019, which claims priority to European Patent Application No. 18213896.6, filed Dec. 19, 2018; the contents of each application is incorporated herein by reference in its entirety.

TECHNICAL FIELD

The present invention relates to a process for the preparation of a zeolitic material having a CHA-type framework structure employing one or more cycloalkyl containing and one or more $C_nH_{2n}OH$ containing tetraalkylammonium compounds as structure directing agents, with n=1 to 6. Furthermore, the present invention relates to a synthetic zeolitic material having a CHA-type framework structure as obtainable and/or obtained according to the inventive process, as well as to the use of the inventive zeolitic material, in particular as a catalyst.

INTRODUCTION

Molecular sieves are classified by the Structure Commission of the International Zeolite Association according to the rules of the IUPAC Commission on Zeolite Nomenclature. According to this classification, framework-type zeolites and other crystalline microporous molecular sieves, for which a structure has been established, are assigned a three letter code and are described in the Atlas of Zeolite Framework Types, 5th edition, Elsevier, London, England (2001).

Among said zeolitic materials, Chabazite is a well studied example, wherein it is the classical representative of the class of zeolitic materials having a CHA framework structure. Besides aluminosilicates such as Chabazite, the class of zeolitic materials having a CHA framework structure comprises a large number of compounds further comprising phosphorous in the framework structure are known which are accordingly referred to as silicoaluminophosphates (SAPO). In addition to said compounds, further molecular sieves of the CHA structure type are known which contain aluminum and phosphorous in their framework, yet contain little or no silica, and are accordingly referred to as alumino-phosphates (APO). Zeolitic materials belonging to the class of molecular sieves having the CHA-type framework structure are employed in a variety of applications, and in particular serve as heterogeneous catalysts in a wide range of reactions such as in methanol to olefin catalysis and selective catalytic reduction of nitrogen oxides $NO_x$ to name some two of the most important applications. Zeolitic materials of the CHA framework type are characterized by three-dimensional 8-membered-ring (8MR) pore/channel systems containing double-six-rings (D6R) and cages.

Zeolitic materials having a CHA-type framework structure and in particular Chabazite with incorporated copper ions (Cu-CHA) are widely used as heterogeneous catalyst for the selective catalytic reduction (SCR) of $NO_x$ fractions in automotive emissions. Based on the small pore openings and the alignment of the copper ions in the CHA cages, these catalyst systems have a unique thermal stability, which tolerates temperatures higher than 700° C. in presence of $H_2O$.

For the industrial production of CHA, cost intensive 1-adamantyltriemethylammoniumhydroxid among other expensive organotemplates are typically employed as structure directing agent in the synthetic procedures for their preparation. U.S. Pat. No. 4,544,538 for example relates to the production of SSZ-13 using 1N-alkyl-3-quinuclidinol, N,N,N-tetraalkyl-1-adamantammonium, or N,N,N-trialkyl-exo-aminonorbornane as the structure directing agent, the SSZ-13 zeolitic material having a CHA-type framework structure.

WO-A-2008/083048, on the other hand, concerns a method for the production of SSZ-13 using a specific N,N,N-trimethyl benzyl quaternary ammonium cation in the presence of seed crystals. Similarly, WO-A-2008/039742 relates to a method for the production of SSZ-13 wherein a mixture of N,N,N-trialkyl benzyl quaternary ammonium cations and N,N,N-tetramethyl-1-adamantammonium are employed as the organotemplate in an effort for increasing costeffectiveness by attempting to reduce the amount of the cost-intensive N,N,N-tetramethyl-1-adamantammonium usually employed in the synthesis of SSZ-13.

WO-A-2008/033229, concerns a method for the production of microporous materials using dicycloalkylammonium compounds as organic templating agents.

WO 2009/141324 A1 relates to a method for the direct synthesis of Cu containing Zeolites having the CHA framework structure, wherein said document mentions N,N,N-trimethylcyclohexylammonium compounds among several compounds as possible structure directing agents for obtaining a zeolitic material having the CHA framework structure. Furthermore, said document teaches the use of a 1-adamantyltrimethylammonium compound in combination with a further ammonium compound which may be a tetramethylammonium compound.

WO 2011/064186 A1 and EP 2 325 143 A2, on the other hand, respectively relate to a process for the preparation of zeolites having the CHA framework structure which employ tetramethylammonium hydroxide in addition to at least one organic structure directing agent. Among the structure directing agents which may be used to this effect, said documents mention N,N,N-trimethylcyclohexylammonium compounds among several compounds as possible structure directing agents for obtaining a zeolitic material having the CHA framework structure, wherein however N,N,N-trimethyl-1-adamantyltrimethylammonium compounds are preferably and effectively taught in said documents for obtaining the aforementioned material.

U.S. Pat. No. 4,610,854 discloses the use of trimethylcyclohexylammonium for the production of SSZ-15, which is a zeolitic material displaying a framework structure other than the CHA-type. US-A2007/0043249, on the other hand, relates to the use of a group of tetraalkylammonium compounds including trimethylcyclohexylammonium as organotemplates for the production of zeolitic materials having the CHA framework structure, wherein said materials are however restricted to alumino- or silicoaluminophosphates necessarily containing $P_2O_5$ in their respective frameworks.

Zones et al. "A Study of Guest/Host Energetics for the Synthesis of Cage Structures NON and CHA" in Studies in Surface Science and Catalysis, Vol. 84, pp. 29-36, Elsevier Science B.V. (1994) describes the synthesis of SSZ-13 using a variety of organotemplates including the trimethylcyclohexylammonium cation, wherein the latter would display very low rates of crystallization in particular when compared to the use of the adamantyltrimethylammonium cation.

WO 2013/182974 A1 discloses the use of cycloalkylammonium compounds as organotemplates for the synthesis of zeolitic materials of the CHA structure type as an alternative to the expensive adamantylammonium compounds used in the art. Furthermore, the process of WO 2013/182974 A1 involves crystallization times of 48 hours or more. US 2017/0113210 A1 also relates to the use of an alternative organotemplate to adamantylammonium compounds for the synthesis of a specific zeolitic material of the CHA structure type, wherein choline cations are employed as the organotemplate. As for WO 2013/182974 A1, however, US 2017/0113210 A1 involves extended crystallization times of 4 to 6 days.

Mithun et al, "Synthesis of SSZ-13 zeolite in the presence of dimethylethylcyclohexyl ammonium ion and direct conversion of ethylene to propylene with the SSZ-13" in Chemical Engineering Journal, 2018, pages 1 to 14 discloses a synthesis of SSZ-13 zeolite using either dimethylethylcyclohexylammonium or choline cation as the organic structure directing agent and zeolite Y with a high SAR as the source of silica and alumina.

Ruinian et al, "Template Design and Economical Strategy for the Synthesis of SSZ-13 (CHA-Type) Zeolite as an Excellent Catalyst for the Selective Catalytic Reduction of NOx by Ammonia" in CHEMCATCHEM, vol. 7, no. 23, 2015, pages 3842-3847 discloses a synthesis of SSZ-13 using a silica source, an alumina source, SSZ-13 seeds, and choline cation. WO 2017/211237 A1 discloses the synthesis of SSZ-13 zeolite with trimethylcyclohexyl ammonium and tetramethyl ammonium cations, a silica source, an alumina source and SSZ-13 seed crystals.

For overcoming the inconveniences of the prior art, WO 2015/185625 A1 teaches the use of one or more tetralkylammonium cations in addition to cycloalkylammonium compounds used as organotemplates for affording shorter synthesis periods, thus affording a highly cost-efficient synthesis process compared to the prior art. However, tetraalkylammonium cations have the disadvantage of being highly toxic, such that their use incurs safety and environmental issues.

Thus, although progress has been made for achieving a fast synthesis of zeolitic materials having the CHA structure type using cycloalkylammonium compounds as a cost-efficient organotemplate, there remains the need for the further improvement of these processes, in particular relative to the toxicity of the compounds such as tetraalkylammonium used therein for reducing the duration of the synthesis.

DETAILED DESCRIPTION

It was therefore the object of the present invention to provide an improved method for the production of a zeolitic material having a CHA-type framework structure, in particular in view of the performance of the process as well as in view of its cost-effectiveness. Thus, it has surprisingly been found that an improved method may be obtained by using one or more choline containing compounds in addition to one or more cycloalkylammonium compounds as the organotemplate. In particular, it has surprisingly been found that the use of such a combination allows for the fast synthesis of a zeolitic material having a CHA-type framework structure, without the use of additives which, in particular due to their toxicity, require particular safety measures, thus considerably increasing the costs of operation. Furthermore, and independently thereof, it has surprisingly been found that the use of a combination one or more choline containing compounds in addition to one or more cycloalkylammonium compounds leads to a CHA-type zeolite with unique physical and chemical properties, in particular with regard to their use as catalysts or catalyst supports, for example in SCR catalytic applications for the treatment of $NO_x$ emissions.

Therefore, the present invention relates to a process for the preparation of a zeolitic material having a CHA-type framework structure comprising $YO_2$ and $X_2O_3$, wherein said process comprises:

(1) providing a mixture comprising one or more sources for $YO_2$, one or more sources for $X_2O_3$, one or more tetraalkylammonium cation $R^1R^2R^3R^4N^+$-containing compounds, and one or more tetraalkylammonium cation $R^5R^6R^7R^8N^+$-containing compounds as structure directing agent;

(2) crystallizing the mixture obtained in (1) for obtaining a zeolitic material having a CHA-type framework structure;

wherein Y is a tetravalent element and X is a trivalent element, wherein $R^1$, $R^2$, $R^3$, $R^5$, $R^6$, and $R^7$ independently from one another stand for alkyl, wherein $R^4$ stands for $C_nH_{2n}OH$ with n=1 to 6, and wherein $R^8$ stands for cycloalkyl.

As regards further components which may be contained in the mixture provided in (1) no particular restrictions apply, such that any suitable further compounds may be contained therein, provided that a zeolitic material having a CHA-type framework structure may be crystallized in (2). It is, however, preferred according to the present invention that the mixture provided in (1) does not contain any substantial amount of a source for $Z_2O_5$, wherein Z is P, preferably P and As, wherein more preferably Z is any pentavalent element which is a source for $Z_2O_5$ in the CHA-type framework structure crystallized in (2). According to the present invention, the term "substantial" relative to the amount of a source of $Z_2O_5$ in (1) preferably refers to an amount of 1 wt. % or less of Z calculated as the element based on 100 wt.-% of the one or more sources for $YO_2$, calculated as the oxide, more preferably of 0.5 wt.-% or less, more preferably of 0.1 wt.-% or less, more preferably of 0.05 wt.-% or less, more preferably of 0.01 wt.-% or less, more preferably of 0.005 wt.-% or less, more preferably of 0.001 wt.-% or less, more preferably of 0.0005 wt.-% or less, and more preferably of 0.0001 wt.-% or less. Furthermore and independently thereof, it is preferred that the mixture provided in (1) does not contain any substantial amount of a tetramethylammonium and/or of a trimethyl benzyl ammonium containing compound, more preferably of a tetramethylammonium and/or of a trialkyl benzyl ammonium compound wherein more preferably the mixture provided in (1) does not contain any substantial amount of an organotemplate other than the one or more tetraalkylammonium cation $R^5R^6R^7R^8N^+$-containing compounds and the one or more tetraalkylammonium cation $R^1R^2R^3R^4N^+$-containing compounds as structure directing agent, wherein more preferably the mixture provided in (1) does not contain any substantial amount of a structure directing agent other than the one or more tetraalkylammonium cation $R^5R^6R^7R^8N^+$-containing compounds one or more tetraalkylammonium cation $R^1R^2R^3R^4N^+$-containing compounds, and wherein even more preferably, the mixture provided in (1) only contains one or more N,N,N-trimethyl-cyclohexylammonium compounds and one or more (2-hydroxyethyl)trimethylammonium compounds, and preferably N,N,N-trimethyl-cyclohexylammonium hydroxide and (2-hydroxyethyl) trimethylammonium hydroxide as structure directing agent for the crystallization of a zeolitic material having a CHA-type framework structure in (2). As regards the term "substantial" relative to the amount of an organotemplate and in particular relative to the amount of a tetramethylammonium and/or of a trialkyl benzyl ammonium compound, said term preferably refers to an amount of 1 wt.-% or less of the organotemplate, and/or of the organotemplate compound in the event that it is provided in the form of a salt, based on 100 wt.-% of the one or more sources for $YO_2$, calculated as the oxide, more preferably of 0.5 wt.-% or less, more preferably of 0.1 wt.-% or less, more preferably of 0.05 wt.-% or less, more preferably of 0.01 wt.-% or less, more preferably of 0.005 wt.-% or less, more preferably of 0.001 wt.-% or less, more preferably of 0.0005 wt.-% or less, and more preferably of 0.0001 wt.-% or less.

Furthermore and independently thereof, it is preferred according to the present invention that the mixture provided in (1) does not comprise a zeolitic material having a CHA-type framework structure, wherein more preferably the mixture provided in (1) does not comprise a zeolitic material.

As regards the alkyl groups $R^1$, $R^2$, $R^3$, $R^5$, $R^6$, and $R^7$, it is preferred according to the present invention that independently from one another they stand for optionally branched $(C_1-C_6)$alkyl, preferably $(C_1-C_5)$alkyl, more preferably $(C_1-C_4)$alkyl, more preferably $(C_1-C_3)$alkyl, and even more preferably for methyl or ethyl, wherein even more preferably $R^1$, $R^2$, $R^3$, $R^5$, $R^6$, and $R^7$ stand for methyl.

With respect to $R^4$, it is preferred according to the present invention that it stands for $C_nH_{2n}OH$ with n=1 to 5, more preferably with n=1 to 4, more preferably with n=1 to 3, more preferably with n=1 or 2, wherein more preferably $R^4$ stands for $C_2H_{2n}OH$, more preferably for 2-hydroxyethyl.

On the other hand, as concerns $R^8$, it is preferred according to the present invention that it stands for optionally 5- to 8-membered cycloalkyl, more preferably for 5- to 7-membered cycloalkyl, more preferably for 5- or 6-membered cycloalkyl, wherein even more preferably $R^8$ stands for optionally heterocyclic 6-membered cycloalkyl, preferably cyclohexyl.

According to the present invention, no particular restrictions apply relative to the one or more tetraalkylammonium cation $R^5R^6R^7R^8N^+$-containing compounds contained in the mixture in (1) as structure directing agent, provided that a zeolitic material having a CHA-type framework structure may be crystallized in (2). It is, however, preferred according to the present invention that the one or more tetraalkylammonium cation $R^5R^6R^7R^8N^+$-containing compounds comprise one or more N,N,N-tri($C_1$-$C_4$)alkyl-($C_5$-$C_7$)cycloalkylammonium compounds, more preferably one or more N,N,N-tri($C_1$-$C_3$)alkyl-($C_5$-$C_6$)cycloalkylammonium compounds, more preferably one or more N,N,N-tri($C_1$-$C_2$)alkyl-($C_5$-$C_6$)cycloalkylammonium compounds, more preferably one or more N,N,N-tri($C_1$-$C_2$)alkyl-cyclopentylammonium and/or one or more N,N,N-tri($C_1$-$C_2$)alkylcyclohexylammonium compounds, more preferably one or more compounds selected from N,N,N-triethyl-cyclohexylammonium, N,N-diethyl-N-methyl-cyclohexylammonium, N,N-dimethyl-N-ethyl-cyclohexylammonium, N,N,N-trimethyl-cyclohexylammonium compounds, and mixtures of two or more thereof, wherein more preferably the one or more tetraalkylammonium cation $R^5R^6R^7R^8N^+$-containing compounds comprise one or more N,N,N-trimethylcyclohexylammonium compounds, and wherein more preferably the one or more tetraalkylammonium cation $R^5R^6R^7R^8N^+$-containing compounds consist of one or more N,N,N-trimethyl-cyclohexylammonium compounds.

Independently thereof, as regards the one or more tetraalkylammonium cation $R^1R^2R^3R^4N^+$-containing compounds, no particular restrictions apply in their regard as well, provided that a zeolitic material having a CHA-type framework structure may be crystallized in (2). It is, however, preferred according to the present invention that the one or more tetraalkylammonium cation $R^1R^2R^3R^4N^+$-containing compounds comprise one or more compounds selected from the group consisting of $(C_1-C_6)$hydroxyalkyl-tri($C_1$-$C_6$)alkylammonium compounds, more preferably $(C_1-C_5)$hydroxyalkyl-tri($C_1$-$C_5$)alkylammonium compounds, more preferably $(C_1-C_4)$hydroxyalkyl-tri($C_1$-$C_4$)alkylammonium compounds, and more preferably $(C_1-C_3)$hydroxyalkyl-tri($C_1$-$C_3$)alkylammonium compounds, wherein independently from one another the alkyl substituents are optionally branched, and wherein more preferably the one or more tetraalkylammonium cation $R^1R^2R^3R^4N^+$-containing compounds are selected from the group consisting of optionally branched hydroxypropyl-tripropylammonium compounds, hydroxypropyl-triethylammonium compounds, hydroxypropyl-trimethylammonium compounds, hydroxyethyl-tripropylammonium compounds, hydroxyethyl-triethylammonium compounds, hydroxyethyl-trimethylammonium compounds, hydroxymethyl-tripropylammonium compounds, hydroxymethyl-triethylammonium compounds, hydroxymethyl-trimethylammonium compounds, and mixtures of two or more thereof, preferably from the group consisting of optionally branched hydroxyethyl-triethylammonium compounds, hydroxyethyl-trimethylammonium compounds, hydroxymethyl-triethylammonium compounds, hydroxymethyl-trimethylammonium compounds, and mixtures of two or more thereof, preferably from the group consisting of hydroxyethyl-trimethylammonium compounds, more preferably from the group consisting of (2-hydroxyethyl)trimethylammonium compounds, wherein more preferably the one or more tetraalkylammonium cation $R^1R^2R^3R^4N^+$-containing compounds comprises one or more (2-hydroxyethyl)trimethylammonium compounds, and wherein more preferably the one or more tetraalkylammonium cation $R^1R^2R^3R^4N^+$-containing compounds consists of one or more (2-hydroxyethyl)trimethylammonium compounds.

With respect to the form in which the one or more tetraalkylammonium cation $R^1R^2R^3R^4N^+$-containing compounds and/or the one or more tetraalkylammonium cation $R^5R^6R^7R^8N^+$-containing compounds are provided to the mixture in (1), no particular restrictions apply, wherein it is preferred according to the present invention that, independently from one another, the one or more tetraalkylammonium cation $R^1R^2R^3R^4N^+$-containing compounds and/or the one or more tetraalkylammonium cation $R^5R^6R^7R^8N^+$-containing compounds are salts, preferably one or more salts selected from the group consisting of halides, preferably chloride and/or bromide, more preferably chloride, hydroxide, sulfate, nitrate, phosphate, acetate, and mixtures of two or more thereof, more preferably from the group consisting of chloride, hydroxide, sulfate, and mixtures of two or more thereof, wherein more preferably the one or more tetraalkylammonium cation $R^1R^2R^3R^4N^+$-containing compounds and/or the one or more tetraalkylammonium cation $R^5R^6R^7R^8N^+$-containing compounds are tetraalkylammonium hydroxides and/or chlorides, and even more preferably tetraalkylammonium hydroxides.

As to the tetravalent element Y contained in the one or more sources for $YO_2$, no particular restrictions apply, provided that a zeolitic material having a CHA-type framework structure comprising $YO_2$ and $X_2O_3$ may be crystallized in (2). According to the present invention, it is however preferred that Y is selected from the group consisting of Si, Sn, Ti, Zr, Ge, and mixtures of two or more thereof, Y preferably being Si.

With respect to the one or more sources for $YO_2$ provided in the mixture in (1), it is preferred according to the present invention that it comprises one or more compounds selected from the group consisting of fumed silica, silica hydrosols, reactive amorphous solid silicas, silica gel, silicic acid, water glass, sodium metasilicate hydrate, sesquisilicate, disilicate, colloidal silica, silicic acid esters, and mixtures of two or more thereof, more preferably from the group consisting of fumed silica, silica hydrosols, reactive amorphous solid silicas, silica gel, silicic acid, colloidal silica, silicic acid esters, and mixtures of two or more thereof, more preferably from the group consisting of fumed silica, silica hydrosols, reactive amorphous solid silicas, silica gel, colloidal silica, and mixtures of two or more thereof, wherein even more preferably the one or more sources for $YO_2$ comprises fumed silica and/or colloidal silica, preferably colloidal silica.

As to the trivalent element X contained in the one or more sources for $X_2O_3$, no particular restrictions apply, provided that a zeolitic material having a CHA-type framework structure comprising $YO_2$ and $X_2O_3$ may be crystallized in (2). According to the present invention, it is however preferred that X is selected from the group consisting of Al, B, In, Ga, and mixtures of two or more thereof, X preferably being Al and/or B, and more preferably being Al.

With respect to the one or more sources for $X_2O_3$ provided in the mixture in (1), it is preferred according to the present invention that it comprises one or more compounds selected from the group consisting of alumina, aluminates, aluminum salts, and mixtures of two or more thereof, more preferably from the group consisting of alumina, aluminum salts, and mixtures of two or more thereof, more preferably from the group consisting of alumina, aluminum tri($C_1$-$C_5$) alkoxide, AlO(OH), Al(OH)$_3$, aluminum halides, preferably aluminum fluoride and/or chloride and/or bromide, more preferably aluminum fluoride and/or chloride, and even more preferably aluminum chloride, aluminum sulfate, aluminum phosphate, aluminum fluorosilicate, and mixtures of two or more thereof, more preferably from the group consisting of aluminum tri($C_2$-$C_4$)alkoxide, AlO(OH), Al(OH)$_3$, aluminum chloride, aluminum sulfate, aluminum phosphate, and mixtures of two or more thereof, more preferably from the group consisting of aluminum tri($C_2$-$C_3$)alkoxide, AlO (OH), Al(OH)$_3$, aluminum chloride, aluminum sulfate, and mixtures of two or more thereof, more preferably from the group consisting of aluminum tripropoxides, AlO(OH), aluminum sulfate, and mixtures of two or more thereof, wherein more preferably the one or more sources for $X_2O_3$ comprises aluminum triisopropoxide, and wherein even more preferably the one or more sources for $X_2O_3$ consists of aluminum triisopropoxide.

According to the present invention, the compounds contained in the mixture provided in (1) are not restricted, such that any suitable further compounds may be contained therein. Thus, it is preferred that the mixture provided in (1) further comprises one or more solvents, wherein said one or more solvents preferably comprises water, preferably distilled water, wherein more preferably water is contained as the one or more solvents in the mixture according to (1), preferably distilled water. Furthermore and independently thereof, it is preferred according to the present invention that the mixture provided in (1) further comprises seed crystals, more preferably seed crystals comprising a zeolitic material having a CHA-type framework structure, wherein according to the present invention it is preferred that the zeolitic material of the seed crystals is obtainable and/or obtained according to any one of the particular and preferred embodiments of the inventive process as described in the present application.

As regards the amounts in which the compounds in the mixture in (1) are provided, no particular restrictions apply, provided that a zeolitic material having a CHA-type framework structure may be crystallized in (2). Thus, as regards the seed crystals preferably contained in the mixture provided in (1), it is preferred that the amount thereof in the mixture according to (1) ranges from 0.1 to 25 wt.-% based on 100 wt.-% of $YO_2$ in the at least one source for $YO_2$, preferably from 0.5 to 22 wt.-%, more preferably from 1 to 19 wt.-%, more preferably from 1.5 to 17 wt.-%, more preferably from 3 to 15 wt.-%, more preferably from 5 to 13 wt.-%, more preferably from 7 to 12 wt.-%, and even more preferably from 9 to 11 wt.-% based on 100 wt.-% of $YO_2$. It is, however, alternatively preferred according to the present invention that the mixture provided in (1) does not comprise any seed crystals.

Furthermore and independently thereof, it is preferred according to the present invention that the molar ratio of the one or more tetraalkylammonium cations $R^1R^2R^3R^4N^+$:$YO_2$ in the mixture provided according to (1) ranges from 0.005 to 0.5, more preferably from 0.01 to 0.25, more preferably from 0.03 to 0.2, more preferably from 0.05 to 0.15, more preferably from 0.07 to 0.13, more preferably from 0.09 to 0.12, and even more preferably from 0.1 to 0.11. Furthermore, and independently thereof, it is preferred according to the present invention that the molar ratio of the one or more tetraalkylammonium cations $R^5R^6R^7R^8N^+$:$YO_2$ in the mixture provided according to (1) ranges from 0.001 to 2.0, more preferably from 0.005 to 1.0, more preferably from 0.01 to 0.5, more preferably from 0.03 to 0.3, more preferably from 0.05 to 0.25, more preferably from 0.08 to 0.23, more preferably from 0.11 to 0.21, more preferably from 0.13 to 0.19, and even more preferably from 0.15 to 0.16. Furthermore, and again independently thereof, it is preferred according to the present invention that the molar ratio $R^1R^2R^3R^4N^+$:$R^5R^6R^7R^8N^+$ of the one or more tetraalkylammonium cations $R^1R^2R^3R^4N^+$ to the one or more tetraalkylammonium cations $R^5R^6R^7R^8N^+$ in the mixture provided according to (1) ranges from 0.01 to 5, preferably from 0.05 to 2, more preferably from 0.1 to 1.5, more preferably from 0.2 to 1.2, more preferably from 0.3 to 1.1, more preferably from 0.4 to 0.1, more preferably from 0.45 to 0.65, and even more preferably from 0.5 to 0.9.

As regards the crystallization in (2), no particular restriction apply as to the conditions under which the crystallization is performed, provided that a zeolitic material having a CHA-type framework structure may be obtained in said step. Thus, in principle, crystallization may be conducted at any suitable temperature, wherein it is preferred according to the present invention that the crystallization in (2) involves heating of the mixture, preferably at a temperature ranging from 90 to 250° C., more preferably from 100 to 220° C., more preferably from 130 to 200° C., more preferably from 150 to 190° C., more preferably from 160 to 180° C., and even more preferably from 165 to 175° C. According to said preferred embodiments of the present invention wherein crystallization in (2) involves heating, no particular restrictions apply relative to the pressure under which the crystallization, again provided that a zeolitic material having a CHA-type framework structure may be obtained in said step. It is, however, preferred according to the present invention that crystallization in (2) is conducted under solvothermal conditions, preferably under hydrothermal conditions. Same applies accordingly relative to the duration of the crystallization in (2), such that in principle, any suitable duration of the crystallization may be chosen, wherein in instances wherein crystallization in (2) involves a heating of the mixture, it is preferred that said heating is performed for a period ranging from 3 to 120 h, preferably from 5 to 72 h, more preferably from 8 to 48 h, more preferably from 12 to 36 h, more preferably from 15 to 30 h, and even more preferably from 18 to 24 h.

As regards the further conditions under which crystallization in (2) is conducted, said crystallization may in principle be performed with or without stirring and/or any other suitable type of agitation of the mixture, wherein it is preferred according to the present invention that crystallization in (2) involves agitating the mixture, preferably by stirring.

In principle, there is no restriction according to the present invention as to the number of steps which may be performed or with regard to their optional repetition. Thus, as regards further steps in addition to (1) and (2), it is preferred according to the present invention that the inventive process further comprises one or more of the following steps of (3) isolating the zeolitic material, preferably by filtration and/or centrifugation, and/or (4) washing the zeolitic material, and/or (5) drying and/or calcining the zeolitic material, and/or (6) subjecting the zeolitic material to an ion-exchange procedure, wherein the steps (3) and/or (4) and/or (5) and/or (6) can be conducted in any order, and wherein one or more of said steps is preferably repeated one or more times.

With regard to the preferred additional step of subjecting the zeolitic material to an ion-exchange procedure, no restrictions apply, neither to the type nor to the number of ions which may be ion-exchanged into the zeolitic material having a CHA-type framework structure. It is, however, preferred according to the present invention that in the at least one step (6) one or more ionic non-framework elements contained in the zeolite framework is ion-exchanged, preferably against one or more cations and/or cationic elements, wherein the one or more cation and/or cationic elements are preferably selected from the group consisting of $H^+$, $NH_4^+$, Sr, Zr, Cr, Mg, Mo, Fe, Co, Ni, Cu, Zn, Ru, Rh, Pd, Ag, Os, Ir, Pt, Au, and mixtures of two or more thereof, more preferably from the group consisting of $H^+$, $NH_4^+$, Sr, Cr, Mo, Fe, Co, Ni, Cu, Zn, Ag, and mixtures of two or more thereof, more preferably from the group consisting of $H^+$, $NH_4^+$, Cr, Mg, Mo, Fe, Ni, Cu, Zn, Ag, and mixtures of two or more thereof, more preferably from the group consisting of Mg, Mo, Fe, Ni, Cu, Zn, Ag, and mixtures of two or more thereof, wherein more preferably the one or more cation and/or cationic elements comprise Cu and/or Fe, preferably Cu, wherein even more preferably the one or more cation and/or cationic elements consist of Cu and/or Fe, preferably of Cu, and wherein the one or more ionic non-framework elements preferably comprise $H^+$ and/or an alkali metal, the alkali metal preferably being selected from the group consisting of Li, Na, K, Cs, and combinations of two or more thereof, more preferably from the group consisting of Li, Na, K, and combinations of two or more thereof, wherein more preferably the alkali metal is Na and/or K, even more preferably Na.

In addition to the inventive process described in the present application, the present invention relates to a synthetic zeolitic material having a CHA-type framework structure obtainable and/or obtained according to the inventive process, and in particular according to any of the particular and preferred embodiments thereof as described in the present application. Preferably, the zeolitic material has a BET specific surface area determined according to DIN 66131 of at least 450 $m^2/g$, preferably in the range of from 500 to 800 $m^2/g$, more preferably in the range of from 550 to 750 $m^2/g$, more preferably in the range of from 550 to 740 $m^2/g$, more preferably in the range of from 650 to 730 $m^2/g$, more preferably in the range of from 680 to 730 $m^2/g$, more preferably in the range of from 690 to 720 $m^2/g$, more preferably in the range of from 700 to 710 $m^2/g$. Preferably, the zeolitic material has a crystallinity, as determined via XRD, in the range of from 80 to 100%, preferably in the range of from 85 to 95%, more preferably in the range of from 87 to 93%. Preferably, at least 95 weight-%, preferably at least 98 weight-%, more preferably at least 99 weight-% of the framework of the zeolitic material consist of Si, Al, O, and H.

Furthermore, the present invention also relates to the use of the synthetic zeolitic material according to any of the particular and preferred embodiment of the present invention as a molecular sieve, as an adsorbent, for ion-exchange, or as a catalyst and/or as a catalyst support, preferably as a catalyst for the selective catalytic reduction (SCR) of nitrogen oxides $NO_x$; for the oxidation of $NH_3$, in particular for the oxidation of $NH_3$ slip in diesel systems; for the decomposition of $N_2O$; as an additive in fluid catalytic cracking (FCC) processes; and/or as a catalyst in organic conversion reactions, preferably in the conversion of alcohols to olefins, and more preferably in methanol to olefin (MTO) catalysis.

The present invention is further illustrated by the following embodiments and combinations of embodiments as indicated by the respective dependencies and back-references. In particular, it is noted that in each instance where a range of embodiments is mentioned, for example in the context of a term such as "The . . . of any of embodiments 1 to 4", every embodiment in this range is meant to be explicitly disclosed for the skilled person, i.e. the wording of this term is to be understood by the skilled person as being synonymous to "The . . . of any of embodiments 1, 2, 3, and 4".

1. A process for the preparation of a zeolitic material having a CHA-type framework structure comprising $YO_2$ and $X_2O_3$, wherein said process comprises:

(1) providing a mixture comprising one or more sources for $YO_2$, one or more sources for $X_2O_3$, one or more tetraalkylammonium cation $R^1R^2R^3R^4N^+$-containing compounds, and one or more tetraalkylammonium cation $R^5R^6R^7R^8N^+$-containing compounds as structure directing agent;

(2) crystallizing the mixture obtained in (1) for obtaining a zeolitic material having a CHA-type framework structure;

wherein Y is a tetravalent element and X is a trivalent element, wherein $R^1$, $R^2$, $R^3$, $R^5$, $R^6$, and $R^7$ independently from one another stand for alkyl, wherein $R^4$ stands for $C_nH_{2n}OH$ with n=1 to 6, and wherein $R^8$ stands for cycloalkyl.

2. The process of embodiment 1, wherein the mixture provided in (1) preferably does not contain any substantial amount of a source for $Z_2O_5$, wherein Z is P, preferably P and As, wherein more preferably Z is any pentavalent element which is a source for $Z_2O_5$ in the CHA-type framework structure crystallized in (2).

3. The process of embodiment 1 or 2, wherein $R^1$, $R^2$, $R^3$, $R^5$, $R^6$, and $R^7$ independently from one another stand for optionally branched $(C_1-C_6)$alkyl, preferably $(C_1-C_5)$alkyl, more preferably $(C_1-C_4)$alkyl, more preferably $(C_1-C_3)$alkyl, and even more preferably for methyl or ethyl, wherein even more preferably $R^1$, $R^2$, $R^3$, $R^5$, $R^6$, and $R^7$ stand for methyl.

4. The process of any of embodiments 1 to 3, wherein $R^4$ stands for $C_nH_{2n}OH$ with n=1 to 5, preferably with n=1 to 4, more preferably with n=1 to 3, more preferably with n=1 or 2, wherein more preferably $R^4$ stands for $C_2H_4OH$, more preferably for 2-hydroxyethyl.

5. The process of any of embodiments 1 to 4, wherein $R^8$ stands for optionally 5- to 8-membered cycloalkyl, preferably for 5- to 7-membered cycloalkyl, more preferably for 5- or 6-membered cycloalkyl, wherein even more preferably $R^8$ stands for optionally heterocyclic 6-membered cycloalkyl, preferably cyclohexyl.

6. The process of any of embodiments 1 to 5, wherein the one or more tetraalkylammonium cation $R^5R^6R^7R^8N^+$-containing compounds comprise one or more N,N,N-tri$(C_1-C_4)$alkyl-$(C_5-C_7)$cycloalkylammonium compounds, preferably one or more N,N,N-tri$(C_1-C_3)$alkyl-$(C_5-C_6)$cycloalkylammonium compounds, more preferably one or more N,N,N-tri$(C_1-C_2)$alkyl-$(C_5-C_6)$ cycloalkylammonium compounds, more preferably one or more N,N,N-tri$(C_1-C_2)$alkyl-cyclopentylammonium and/or one or more N,N,N-tri$(C_1-C_2)$alkylcyclohexylammonium compounds, more preferably one or more compounds selected from N,N,N-triethyl-cyclohexylammonium, N,N-diethyl-N-methyl-cyclohexylammonium, N,N-dimethyl-N-ethyl-cyclohexylammonium, N,N,N-trimethyl-cyclohexylammonium compounds, and mixtures of two or more thereof, wherein more preferably the one or more tetraalkylammonium cation $R^5R^6R^7R^8N^+$-containing compounds comprise one or more N,N,N-trimethyl-cyclohexylammonium compounds, and wherein more preferably the one or more tetraalkylammonium cation $R^5R^6R^7R^8N^+$-containing compounds consist of one or more N,N,N-trimethyl-cyclohexylammonium compounds.

7. The process of any of embodiments 1 to 6, wherein the one or more tetraalkylammonium cation $R^1R^2R^3R^4N^+$-containing compounds comprise one or more compounds selected from the group consisting of $(C_1-C_6)$ hydroxyalkyl-tri$(C_1-C_6)$alkylammonium compounds, preferably $(C_1-C_5)$hydroxyalkyl-tri$(C_1-C_5)$alkylammonium compounds, more preferably $(C_1-C_4)$hydroxyalkyl-tri$(C_1-C_4)$alkylammonium compounds, and more preferably $(C_1-C_3)$hydroxyalkyl-tri$(C_1-C_3)$alkylammonium compounds, wherein independently from one another the alkyl substituents are optionally branched, and wherein more preferably the one or more tetraalkylammonium cation $R^1R^2R^3R^4N^+$-containing compounds are selected from the group consisting of optionally branched hydroxypropyl-tripropylammonium compounds, hydroxypropyl-triethylammonium compounds, hydroxypropyl-trimethylammonium compounds, hydroxyethyl-tripropylammonium compounds, hydroxyethyl-triethylammonium compounds, hydroxyethyl-trimethylammonium compounds, hydroxymethyl-tripropylammonium compounds, hydroxymethyl-triethylammonium compounds, hydroxymethyl-trimethylammonium compounds, and mixtures of two or more thereof, preferably from the group consisting of optionally branched hydroxyethyl-triethylammonium compounds, hydroxyethyl-trimethylammonium compounds, hydroxymethyl-triethylammonium compounds, hydroxymethyl-trimethylammonium compounds, and mixtures of two or more thereof, preferably from the group consisting of hydroxyethyl-trimethylammonium compounds, more preferably from the group consisting of (2-hydroxyethyl)trimethylammonium compounds, wherein more preferably the one or more tetraalkylammonium cation $R^1R^2R^3R^4N^+$-containing compounds comprises one or more (2-hydroxyethyl)trimethylammonium compounds, and wherein more preferably the one or more tetraalkylammonium cation $R^1R^2R^3R^4N^+$-containing compounds consists of one or more (2-hydroxyethyl)trimethylammonium compounds.

8. The process of any of embodiments 1 to 7, wherein the one or more tetraalkylammonium cation $R^1R^2R^3R^4N^+$-containing compounds and/or the one or more tetraalkylammonium cation $R^5R^6R^7R^8N^+$-containing compounds are salts, preferably one or more salts selected from the group consisting of halides, preferably chloride and/or bromide, more preferably chloride, hydroxide, sulfate, nitrate, phosphate, acetate, and mixtures of two or more thereof, more preferably from the group consisting of chloride, hydroxide, sulfate, and mixtures of two or more thereof, wherein more preferably the one or more tetraalkylammonium cation $R^1R^2R^3R^4N^+$-containing compounds and/or the one or more tetraalkylammonium cation $R^5R^6R^7R^8N^+$-containing compounds are tetraalkylammonium hydroxides and/or chlorides, and even more preferably tetraalkylammonium hydroxides.

9. The process of any of embodiments 1 to 8, wherein Y is selected from the group consisting of Si, Sn, Ti, Zr, Ge, and mixtures of two or more thereof, Y preferably being Si.

10. The process of any of embodiments 1 to 9, wherein the one or more sources for $YO_2$ comprises one or more compounds selected from the group consisting of fumed silica, silica hydrosols, reactive amorphous solid silicas, silica gel, silicic acid, water glass, sodium metasilicate hydrate, sesquisilicate, disilicate, colloidal silica, silicic acid esters, and mixtures of two or more thereof, preferably from the group consisting of fumed silica, silica hydrosols, reactive amorphous solid silicas, silica gel, silicic acid, colloidal silica, silicic acid esters, and mixtures of two or more thereof, more preferably from the group consisting of fumed silica, silica hydrosols, reactive amorphous solid silicas, silica gel, colloidal silica, and mixtures of two or more thereof, wherein even more preferably the one or more sources for $YO_2$ comprises fumed silica and/or colloidal silica, preferably colloidal silica.

11. The process of any of embodiments 1 to 10, wherein X is selected from the group consisting of Al, B, In, Ga, and mixtures of two or more thereof, X preferably being Al and/or B, and more preferably being Al.

12. The process of any of embodiments 1 to 11, wherein the one or more sources for $X_2O_3$ comprises one or more compounds selected from the group consisting of alumina, aluminates, aluminum salts, and mixtures of two or more thereof, preferably from the group consisting of alumina, aluminum salts, and mixtures of two or more thereof, more preferably from the group consisting of alumina, aluminum tri($C_1$-$C_5$)alkoxide, AlO(OH), Al(OH)$_3$, aluminum halides, preferably aluminum fluoride and/or chloride and/or bromide, more preferably aluminum fluoride and/or chloride, and even more preferably aluminum chloride, aluminum sulfate, aluminum phosphate, aluminum fluorosilicate, and mixtures of two or more thereof, more preferably from the group consisting of aluminum tri($C_2$-$C_4$)alkoxide, AlO(OH), Al(OH)$_3$, aluminum chloride, aluminum sulfate, aluminum phosphate, and mixtures of two or more thereof, more preferably from the group consisting of aluminum tri($C_2$-$C_3$)alkoxide, AlO(OH), Al(OH)$_3$, aluminum chloride, aluminum sulfate, and mixtures of two or more thereof, more preferably from the group consisting of aluminum tripropoxides, AlO(OH), aluminum sulfate, and mixtures of two or more thereof, wherein more preferably the one or more sources for $X_2O_3$ comprises aluminum triisopropoxide, and wherein even more preferably the one or more sources for $X_2O_3$ consists of aluminum triisopropoxide.

13. The process of any of embodiments 1 to 12, wherein the mixture according to (1) further comprises one or more solvents, wherein said one or more solvents preferably comprises water, preferably distilled water, wherein more preferably water is contained as the one or more solvents in the mixture according to (1), preferably distilled water.

14. The process of any of embodiments 1 to 13, wherein the molar ratio of the one or more tetraalkylammonium cations $R^1R^2R^3R^4N^+$:$YO_2$ in the mixture provided according to (1) ranges from 0.005 to 0.5, preferably from 0.01 to 0.25, more preferably from 0.03 to 0.2, more preferably from 0.05 to 0.15, more preferably from 0.07 to 0.13, more preferably from 0.09 to 0.12, and even more preferably from 0.1 to 0.11.

15. The process of any of embodiments 1 to 14, wherein the molar ratio of the one or more tetraalkylammonium cations $R^5R^6R^7R^8N^+$:$YO_2$ in the mixture provided according to (1) ranges from 0.001 to 2.0, preferably from 0.005 to 1.0, more preferably from 0.01 to 0.5, more preferably from 0.03 to 0.3, more preferably from 0.05 to 0.25, more preferably from 0.08 to 0.23, more preferably from 0.11 to 0.21, more preferably from 0.13 to 0.19, and even more preferably from 0.15 to 0.16.

16. The process of any of embodiments 1 to 15, wherein the molar ratio $R^1R^2R^3R^4N^+$:$R^5R^6R^7R^8N^+$ of the one or more tetraalkylammonium cations $R^1R^2R^3R^4N^+$ to the one or more tetraalkylammonium cations $R^5R^6R^7R^8N^+$ in the mixture provided according to (1) ranges from 0.01 to 5, preferably from 0.05 to 2, more preferably from 0.1 to 1.5, more preferably from 0.2 to 1.2, more preferably from 0.3 to 1.1, more preferably from 0.4 to 0.1, more preferably from 0.45 to 0.65, and even more preferably from 0.5 to 0.9.

17. The process of any of embodiments 1 to 16, wherein the crystallization in (2) involves heating of the mixture, preferably at a temperature ranging from 90 to 250° C., more preferably from 100 to 220° C., more preferably from 130 to 200° C., more preferably from 150 to 190° C., more preferably from 160 to 180° C., and even more preferably from 165 to 175° C.

18. The process of any of embodiments 1 to 17, wherein the crystallization in (2) is conducted under solvothermal conditions, preferably under hydrothermal conditions.

19. The process of any of embodiments 1 to 18, wherein the crystallization in (2) involves heating of the mixture for a period ranging from 3 to 120 h, preferably from 5 to 72 h, more preferably from 8 to 48 h, more preferably from 12 to 36 h, more preferably from 15 to 30 h, and even more preferably from 18 to 24 h.

20. The process of any of embodiments 1 to 19, wherein the crystallization in (2) involves agitating the mixture, preferably by stirring.

21. The process of any of embodiments 1 to 20 further comprising one or more of the following steps of
   (3) isolating the zeolitic material, preferably by filtration and/or centrifugation,
   and/or
   (4) washing the zeolitic material,
   and/or
   (5) drying and/or calcining the zeolitic material,
   and/or
   (6) subjecting the zeolitic material to an ion-exchange procedure,
   wherein the steps (3) and/or (4) and/or (5) and/or (6) can be conducted in any order, and
   wherein one or more of said steps is preferably repeated one or more times.

22. The process of embodiment 21, wherein in the at least one step (6) one or more ionic non-framework elements contained in the zeolite framework is ion-exchanged, preferably against one or more cations and/or cationic elements, wherein the one or more cation and/or cationic elements are preferably selected from the group consisting of $H^+$, $NH_4+$, Sr, Zr, Cr, Mg, Mo, Fe, Co, Ni, Cu, Zn, Ru, Rh, Pd, Ag, Os, Ir, Pt, Au, and mixtures of two or more thereof, more preferably from the group consisting of $H^+$, $NH_4+$, Sr, Cr, Mo, Fe, Co, Ni, Cu, Zn, Ag, and mixtures of two or more thereof, more preferably from the group consisting of $H^+$, $NH_4+$, Cr, Mg, Mo, Fe, Ni, Cu, Zn, Ag, and mixtures of two or more thereof, more preferably from the group consisting of Mg, Mo, Fe, Ni, Cu, Zn, Ag, and mixtures of two or more thereof, wherein more preferably the one or more cation and/or cationic elements comprise Cu and/or Fe, preferably Cu, wherein even more preferably the one or more cation and/or cationic elements consist of Cu and/or Fe, preferably of Cu, and
   wherein the one or more ionic non-framework elements preferably comprise $H^+$ and/or an alkali metal, the alkali metal preferably being selected from the group consisting of Li, Na, K, Cs, and combinations of two or more thereof, more preferably from the group consisting of Li, Na, K, and combinations of two or more thereof, wherein more preferably the alkali metal is Na and/or K, even more preferably Na.

23. The process of any of embodiments 1 to 22, wherein the mixture provided in (1) does not contain any substantial amount of a tetramethylammonium and/or of a trimethyl benzyl ammonium containing compound, preferably of a tetramethylammonium and/or of a trialkyl benzyl ammonium compound wherein preferably the mixture provided in (1) does not contain any substantial amount of an organotemplate other than the one or more tetraalkylammonium cation $R^5R^6R^7R^8N^+$-containing compounds and the one or more tetraalkylammonium cation $R^1R^2R^3R^4N^+$-containing compounds as structure directing agent, wherein more preferably the mixture provided in (1) does not contain any substantial amount of a structure directing agent other than the one or more tetraalkylammonium cation $R^5R^6R^7R^8N^+$-containing compounds one or more tet-raalkylammonium cation $R^1R^2R^3R^4N^+$-containing compounds, and wherein even more preferably, the mixture provided in (1) only contains one or more N,N,N-trimethylcyclohexylammonium compounds and one or more (2-hydroxyethyl)trimethylammonium compounds, and preferably N,N,N-trimethyl-cyclo-hexylammonium hydroxide and (2-hydroxyethyl)trim-ethylammonium hydroxide as structure directing agent for the crystallization of a zeolitic material having a CHA-type framework structure in (2).

24. The process of any of embodiments 1 to 23, wherein the mixture provided in (1) further comprises seed crystals, preferably seed crystals comprising a zeolitic material having a CHA-type framework structure, wherein the zeolitic material of the seed crystals is preferably obtainable and/or obtained according to any one of embodiments 1 to 23.

25. The process of embodiment 24, wherein the amount of seed crystals in the mixture according to (1) ranges from 0.1 to 25 wt.-% based on 100 wt.-% of $YO_2$ in the at least one source for $YO_2$, preferably from 0.5 to 22 wt.-%, more preferably from 1 to 19 wt.-%, more preferably from 1.5 to 17 wt.-%, more preferably from 3 to 15 wt.-%, more preferably from 5 to 13 wt.-%, more preferably from 7 to 12 wt.-%, and even more preferably from 9 to 11 wt.-% based on 100 wt.-% of $YO_2$.

26. The process of any of embodiments 1 to 23, wherein the mixture provided in (1) for crystallization in (2) does not comprise a zeolitic material having a CHA-type framework structure, preferably does not comprise a zeolitic material, and more preferably does not com-prise any seed crystals.

27. A synthetic zeolitic material having a CHA-type framework structure obtainable and/or obtained according to the process of any of embodiments 1 to 26.

28. The synthetic zeolitic material of embodiment 27, wherein the zeolitic material has a BET specific surface area determined according to DIN 66131 of at least 450 $m^2/g$, preferably in the range of from 500 to 800 $m^2/g$, more preferably in the range of from 550 to 750 $m^2/g$, more preferably in the range of from 550 to 740 $m^2/g$, more preferably in the range of from 650 to 730 $m^2/g$, more preferably in the range of from 680 to 730 $m^2/g$, more preferably in the range of from 690 to 720 $m^2/g$, more preferably in the range of from 700 to 710 $m^2/g$.

29. The synthetic zeolitic material of any one of embodi-ments 27 or 28, wherein the zeolitic material has a crystallinity, as determined via XRD, in the range of from 80 to 100%, preferably in the range of from 85 to 95%, more preferably in the range of from 87 to 93%.

30. The synthetic zeolitic material of any one of embodi-ments 27 to 29, wherein at least 95 weight-%, prefer-ably at least 98 weight-%, more preferably at least 99 weight-% of the framework of the zeolitic material consist of Si, Al, O, and H.

31. Use of a synthetic zeolitic material having a CHA-type framework structure according to embodiments 27 to 29 as a molecular sieve, as an adsorbent, for ion-exchange, or as a catalyst and/or as a catalyst support, preferably as a catalyst for the selective catalytic reduc-tion (SCR) of nitrogen oxides $NO_x$; for the oxidation of $NH_3$, in particular for the oxidation of $NH_3$ slip in diesel systems; for the decomposition of $N_2O$; as an additive in fluid catalytic cracking (FCC) processes; and/or as a catalyst in organic conversion reactions, preferably in the conversion of alcohols to olefins, and more preferably in methanol to olefin (MTO) catalysis.

EXAMPLES

Measurement of the x-Ray Diffraction Patterns

Figure 1:
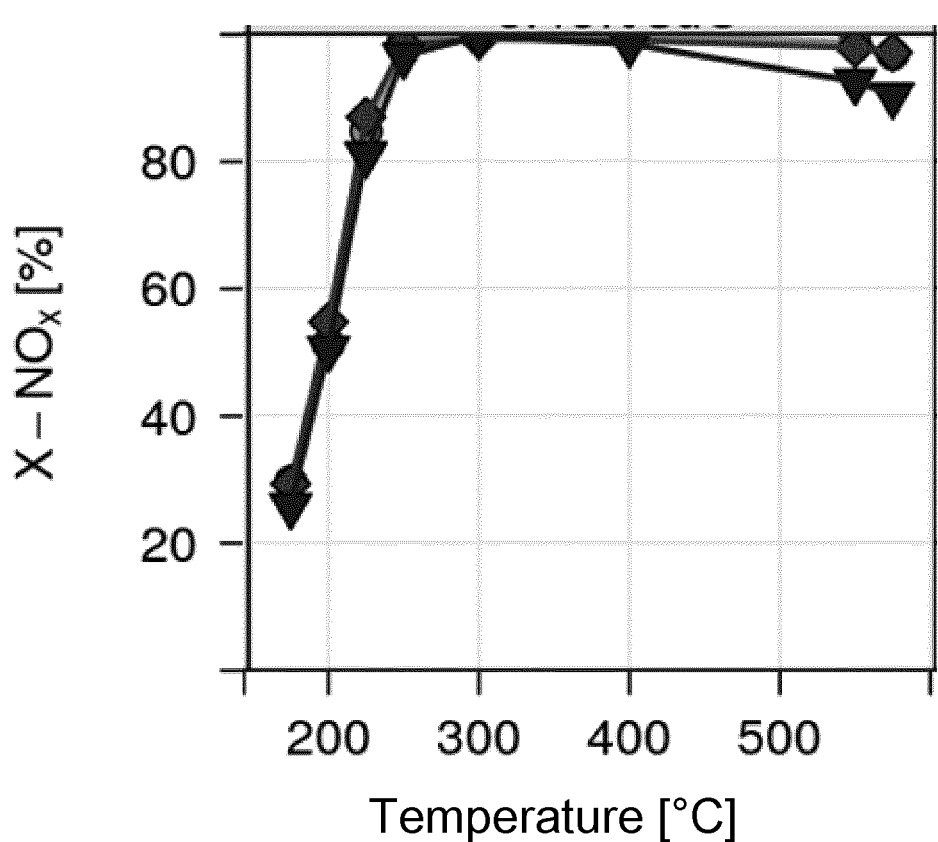
FIGS. 1 and 4 display the results from SCR testing performed on the zeolitic materials obtained from examples 1 and 3, respectively, after loading thereof with copper and shaping, respectively. In the figures, the temperature at which the SCR testing was performed is shown along the abscissa, and the $NO_x$ conversion in % is shown along with ordinate. The testing values for the fresh catalyst is shown as "●" for the material aged for 50 h at 650° C. is shown as "◆" and for the material aged for 16 h at 820° C. is shown as "▼".

For examples 1 and 2, the powder X-ray diffraction (PXRD) data was collected using a diffractometer (D8 Advance Series II, Bruker AXS GmbH) equipped with a LYNXEYE detector operated with a Copper anode X-ray tube running at 40 kV and 40 mA. The geometry was BraggBrentano, and air scattering was reduced using an air scatter shield. The crystallinity was determined using DIF-FRAC.EVA software (User Manual for DIFFRAC.EVA, Bruker AXS GmbH, Karlsruhe).

For example 3, the powder X-ray diffraction (XRD) patterns were collected using a diffractometer (Rigaku Ultima IV) equipped with a D/Tex Ultra detector operated with Cu Kα monochromatized radiation at 40 kV and 40 mA. A scan step was 0.02° at a scan speed of 200/min. Crystallinity was calculated using integrated peak areas of the peaks in 2theta rage of 20°-35°.

Measurement of the SEM Images
The SEM images were measured with secondary elec-trons at 5 kV for providing topographic images. The samples were mounted for measurement using Leit-C Plast and were coated with around 8 nm Pt. The SEM measurements were performed with an instrument from Zeiss, Model Ultra55.

Example 1: Preparation of a Zeolitic Material Having a CHA-Type Framework Structure Using trimethylcyclohexylammonium and (2-hydroxyethyl)trimethylammonium (choline)

125.9 g cyclohexyltrimethylammonium hydroxide (CHTMAOH, 20% aqueous solution) were placed in a beaker. 14.7 g aluminium triisopropylate were then added under stirring and dissolved in the solution during about 1.5 h. 29.8 g choline hydroxide (46% aqueous solution) were then added, and the mixture was stirred another 0.5 h. 150.2 g colloidal silica (Ludox AS 40) were then added and the resulting mixture further stirred for 0.5 h. The reaction mixture displaying molar ratios of SiO2 :0.036 Al2O3 :0.158 CHTMAOH:0.113 choline hydroxide was then divided over two autoclaves and heated to 170° C. and held at that temperature for 72 h.

The crystallized mixtures were then united and the solid product filtered off and washed with distilled water. The solid product was then heated to 120° C. during 1 h and held at that temperature for 2 h, and then further heated to 500° C. over 190 min and held at that temperature for 5 h, thus affording 70.0 g of a zeolitic material having a CHA-type framework structure. The crystallinity of the zeolitic material as determined by XRD was 84% and consisted of 100% of the CHA phase.

Elemental analysis of the product afforded: 0.1 wt.-% C, 3.0 wt.-% Al, 0.12 wt.-% Na, and 40 wt.-% Si.

The BET surface area of the material was determined to be 455.5439 m$^2$/g.

Example 2: Preparation of a Zeolitic Material Having a CHA-Type Framework Structure Using trimethylcyclohexylammonium and (2-hydroxyethyl)trimethylammonium (choline)

The procedure of example 1 was repeated, except that upon crystallization in the autoclaves, the reaction mixture was stirred at a rate of 20 rpm, wherein in example 1 the autoclaves were not stirred. After washing, drying, and calcination, 69.1 g of solid product was obtained from the crystallization process, wherein the crystallinity of the zeolitic material as determined by XRD was 81% and consisted of 100% of the CHA phase.

The BET surface area of the material was determined to be 473.7261 m$^2$/g.

Example 3: Preparation of a Zeolitic Material Having a CHA-Type Framework Structure Using trimethylcyclohexylammonium and (2-hydroxyethyl)trimethylammonium (Choline)

2.51 g of cyclohexyltrimetylammonium hydroxide (CHTMAOH, 20 wt % in water) and 0.598 g of choline hydroxide (46 wt % in water) were first mixed. 0.112 g of aluminum hydroxide was added slowly under stirring. After dispersion of aluminum hydroxide at room temp for 30 min, 3.00 g of Ludox AS-40 was added, for affording a mixture with molar ratios of SiO$_2$:0.036 Al$_2$O$_3$:0.158 CHTMAOH: 0.113 Choline:11.5 H$_2$O. The mixture was further stirred before the addition of 0.120 g of CHA seed crystals for 10 min. The mixture was then charged to a 23-ml Teflon-lined autoclave. The tightly closed autoclave was placed in an oven pre-heated at 200° C. Hydrothermal treatment was carried out at 200° C. with 20 rpm tumbling for 1-5 days. Samples were collected using centrifugation at 14000 rpm and washed with water until the pH became about 7-8. The solid product was dried at 80° C.

The crystallinity of the sample as obtained from XRD depending on the reaction time is shown in the table below, wherein the respective product consisted of 100% of the CHA phase.

| reaction time [d] | crystallinity |
| --- | --- |
| 1 | 88.4% |
| 2 | 88.7% |

18

-continued

| reaction time [d] | crystallinity |
| --- | --- |
| 3 | 88.0% |
| 5 | 89.9% |

After 1 day of reaction time, a sample was collected, washed and dried as indicated above. The sample was then calcined at 600° C. for 5 hours and was found to have the following properties:

Elemental analysis of the product afforded: <0.1 wt.-% C, 2.7 wt.-% Al, 0.08 wt.-% Na, and 39 wt.-% Si.

The BET surface area of the material was determined to be 701.6513 m$^2$/g.

Figure 3:
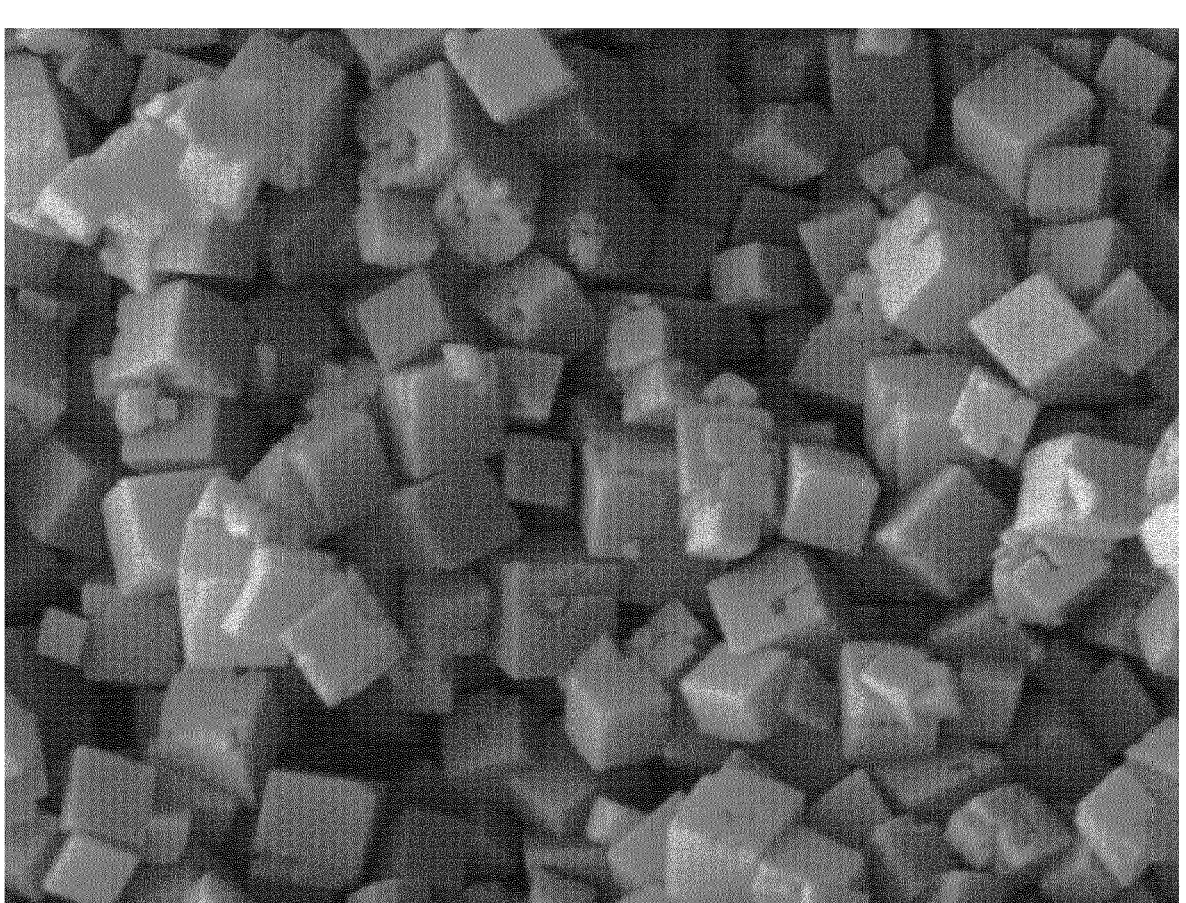
FIG. 3 shows an SEM image of the zeolitic material obtained according to example 3, wherein the scale of 500 nm is indicated in the lower right hand corner of the image.
Figure 4:
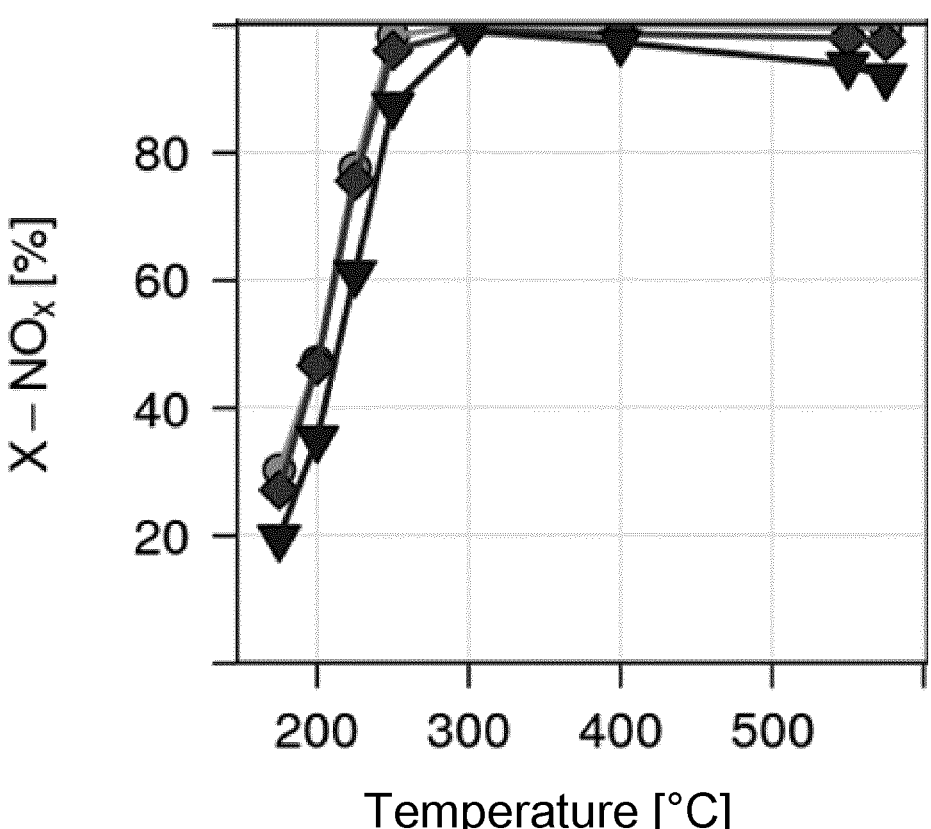
Figure 5:
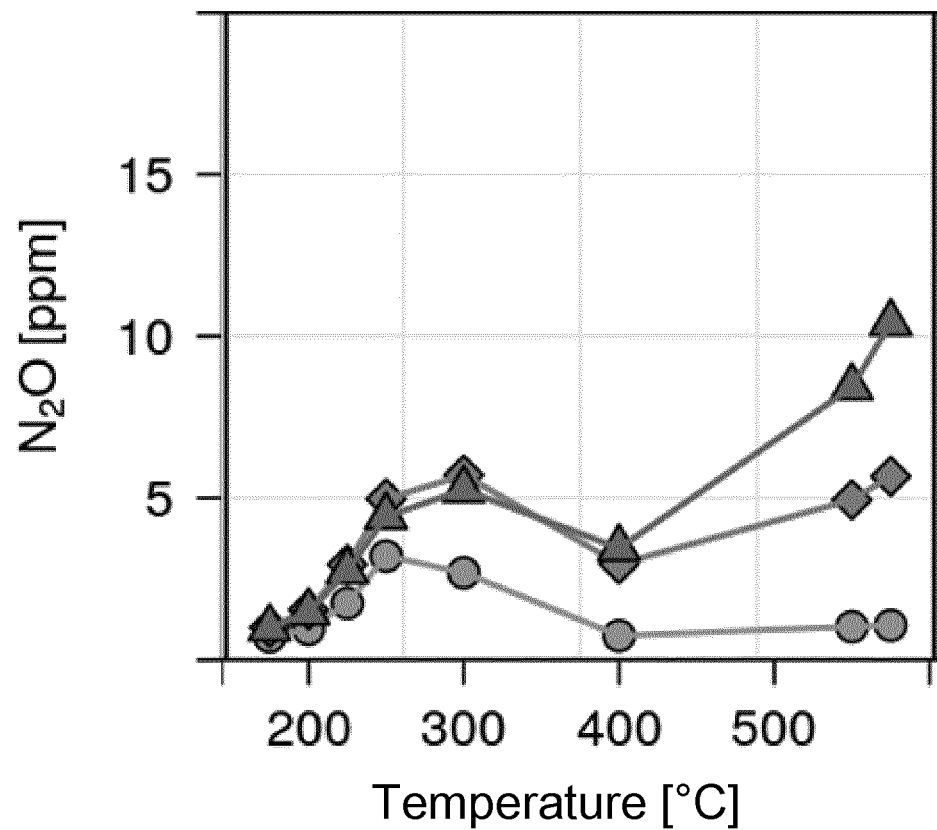

FIG. 3 shows an SEM image of the crystalline product.

Example 4: SCR Catalytic Testing

The zeolitic materials from examples 1 and 3 were wet impregnated with an aqueous copper nitrate solution (incipient wetness impregnation). The materials were then dried and calcined at 450° C. for 5 h for affording a zeolitic material loaded with 3.43 wt.-% (example 1) and 2.75 wt. % (example 3) of copper calculated as CuO.

The zeolitic materials which had been loaded with copper were then shaped by preparing an aqueous slurry to which zirconium acetate was added as binder material precursor (5 weight-% based on zeolitic material). The slurries were then respectively shaped to a tablet, dried under stirring and calcined for 1 h at 550° C. The obtained tablet was then crushed and sieved to a particle size in the range of from 250 to 500 micrometer. The catalyst was then aged for 50 h at 650° C. in 10% steam/air, and for 16 h at 820° C. in 10% steam/air. Standard SCR conditions were applied by subjecting the catalytic material to a gas stream (500 ppm NO, 500 ppm NH$_3$, 5% H$_2$O, 10% 02, balance N$_2$) at a gas hourly space velocity of 80,000 h$^{-1}$, at temperatures of the gas stream of 200° C., 400° C., 575° C. (first run for degreening); and 175° C., 200° C., 225° C., 250° C., 300° C., 450° C., 550° C., 575° C. The amount of the catalytic material was adjusted to 120 mg per reactor; the material was diluted with corundum to about 1 ml volume. The space velocities simulated 1 ml of a coated catalyst.

The results from SCR testing relative to the NO$_x$ conversion is shown in the table below for testing at 200° C. and 575° C., respectively.

| SCR testing temperature | aging | NO$_x$ conversion [%] | |
| --- | --- | --- | --- |
| | | zeolite from example 1 | zeolite from example 3 |
| 200° C. | none | 51 | 47 |
| 200° C. | 50 h at 650° C. | 55 | 47 |
| 200° C. | 16 h at 820° C. | 51 | 35 |
| 575° C. | none | 97 | 99 |
| 575° C. | 50 h at 650° C. | 97 | 97 |
| 575° C. | 16 h at 820° C. | 90 | 92 |

Figure 2:
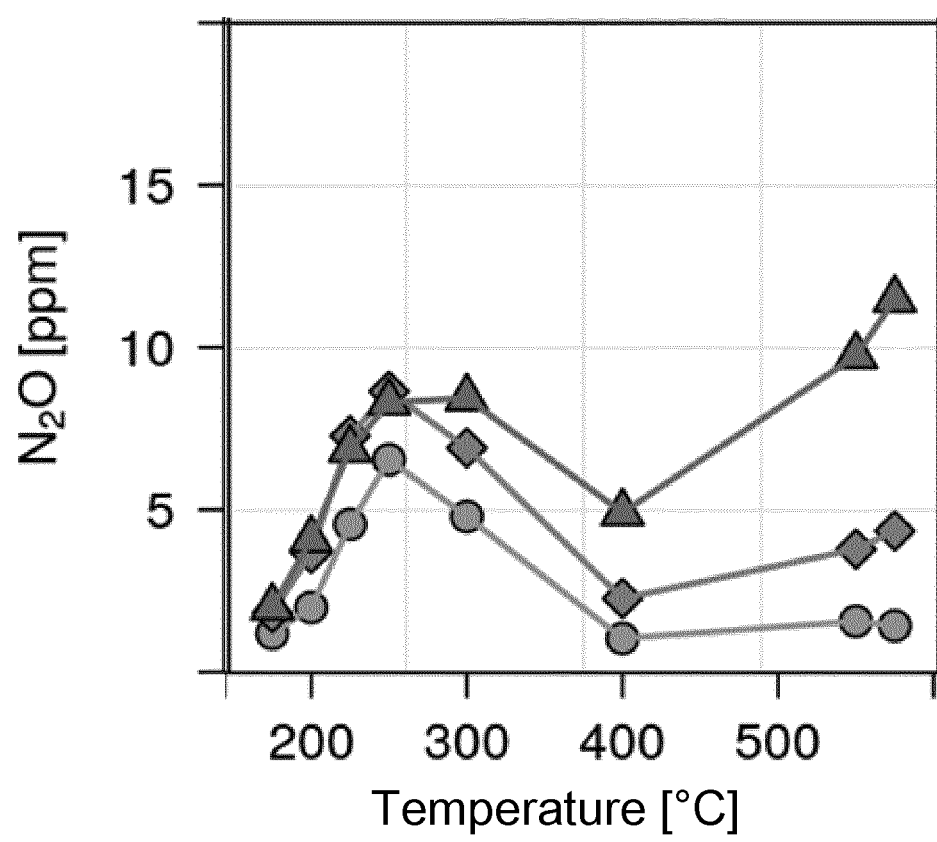
FIGS. 2 and 5 display the results for the $N_2O$ make during SCR testing performed on the zeolitic materials obtained from examples 1 and 3, respectively, after loading thereof with copper and shaping, respectively. In the figures, the temperature at which the SCR testing was performed is shown along the abscissa, and the $N_2O$ make in % is shown along with ordinate. The testing values for the fresh catalyst is shown as "●" for the material aged for 50 h at 650° C. is shown as "◆" and for the material aged for 16 h at 820° C. is shown as "▲".

Further results from SCR testing are shown in the figures, wherein FIGS. 1 (zeolite from example 1) and 4 (zeolite from example 3) show the results depending on the temperature of the catalyst testing for the fresh zeolitic material (●) for the material aged for 50 h at 650° C. (♦) and for the material aged for 16 h at 820° C. (▼). FIGS. 2 (zeolite from example 1) and 5 (zeolite from example 3), on the other hand, display the N$_2$O make during SCR, wherein the results are again shown depending on the temperature of the catalyst testing for the fresh zeolitic material (●) for the material aged for 50 h at 650° C. (◆) and for the material aged for 16 h at 820° C. (▲).

Thus, as may be taken from the results from SCR testing, the materials obtained according to the inventive process display excellent performance in SCR, both with regard to high $NO_x$ conversion and low $N_2O$ make both in the fresh and aged states.

LIST OF CITED PRIOR ART

WO-A-2008/083048
WO-A-2008/033229
WO 2009/141324 A1
WO 2011/064186 A1
EP 2 325 143 A2
U.S. Pat. No. 4,610,854
US-A-2007/0043249
Zones et al. "A Study of Guest/Host Energetics for the Synthesis of Cage Structures NON and CHA" in Studies in Surface Science and Catalysis, Vol. 84, pp. 29-36, Elsevier Science B.V. (1994)
WO 2013/182974 A1
WO 2013/182974 A1
US 2017/0113210 A1
WO 2015/185625 A1
Mithun et al, "Synthesis of SSZ-13 zeolite in the presence of dimethylethylcyclohexyl ammonium ion and direct conversion of ethylene to propylene with the SSZ-13" in Chemical Engineering Journal, 2018, pages 1 to 14
Ruinian et al, "Template Design and Economical Strategy for the Synthesis of SSZ-13 (CHA-Type) Zeolite as an Excellent Catalyst for the Selective Catalytic Reduction of NOx by Ammonia" in CHEMCATCHEM, vol. 7, no. 23, 2015, pages 3842-3847
WO 2017/211237 A1

The invention claimed is:

1. A process for preparing a zeolitic material having a CHA-type framework structure comprising $YO_2$ and $X_2O_3$, wherein the process comprises:

providing a mixture comprising one or more sources for $YO_2$, one or more sources for $X_2O_3$, one or more tetraalkylammonium cation $R^1R^2R^3R^4N^+$-containing compounds, and one or more tetraalkylammonium cation $R^5R^6R^7R^8N^+$-containing compounds as structure directing agent; and crystallizing the mixture to obtain a zeolitic material having a CHA-type framework structure;

wherein Y is a tetravalent element and X is Al, wherein $R^1$, $R^2$, $R^3$, $R^5$, $R^6$, and $R^7$ stand for methyl, wherein $R^4$ is chosen from $C_nH_{2n}OH$ and n ranges from 1 to 6, wherein $R^8$ stands for cyclohexyl, wherein a molar ratio $R^1R^2R^3R^4N^+$:$YO_2$ of the one or more tetraalkylammonium cation $R^1R^2R^3R^4N^+$-containing compounds to $YO_2$ ranges from 0.1 to 0.5, wherein a molar ratio $R^5R^6R^7R^8N^+$:$YO_2$ of the one or more tetraalkylammonium cation $R^5R^6R^7R^8N^+$-containing compounds to $YO_2$ ranges from 0.11 to 0.21, wherein the one or more sources for $X_2O_3$ comprises one or more compounds selected from the group consisting of aluminum tri ($C_2$-$C_3$)alkoxide, AlO(OH), Al(OH)$_3$, aluminum chloride, aluminum sulfate, and mixtures of two or more thereof, and wherein a molar ratio $R^1R^2R^3R^4N^+$:$R^5R^6R^7R^8N^+$ of the one or more tetraalkylammonium cations $R^1R^2R^3R^4N^+$ to the one or more tetraalkylammonium cations $R^5R^6R^7R^8N^+$ in the mixture of the providing step ranges from 0.5 to 0.9.

2. The process of claim 1, wherein the one or more tetraalkylammonium cation $R^1R^2R^3R^4N^+$-containing compounds comprise one or more compounds chosen from ($C_1$-$C_6$) hydroxyalkyl-trimethyl ammonium compounds.

3. The process of claim 1, wherein Y is chosen from Si, Sn, Ti, Zr, Ge, and mixtures thereof.

4. The process of claim 1, wherein the mixture further comprises one or more solvents.

5. The process of claim 1, wherein the mixture is heated during the crystallizing.

6. The process of claim 1, wherein crystallizing the mixture is conducted under solvothermal conditions.

7. The process of claim 1, further comprising one or more of isolating the zeolitic material, washing the zeolitic material, drying the zeolitic material, calcining the zeolitic material, and ion-exchanging the zeolitic material.

8. The process of claim 1, wherein the mixture further comprises a seed crystal.

9. The process of claim 1, wherein, prior to the crystallizing, the mixture does not comprise zeolitic material having a CHA-type framework structure.

* * * * *